(12) United States Patent
Winkens et al.

(10) Patent No.: US 9,658,095 B2
(45) Date of Patent: May 23, 2017

(54) CAPACITIVE FILL LEVEL SENSOR

(71) Applicant: Balluff GmbH, Neuhausen a.d.F. (DE)

(72) Inventors: Frank Winkens, Ludwigshafen (DE); Juergen Glock, Hirschberg (DE)

(73) Assignee: Balluff GmbH, Neuhausen a.d.F. (DE)

( * ) Notice: Subject to any disclaimer, the term of this patent is extended or adjusted under 35 U.S.C. 154(b) by 34 days.

(21) Appl. No.: 14/783,200

(22) PCT Filed: Apr. 8, 2014

(86) PCT No.: PCT/DE2014/100121
§ 371 (c)(1),
(2) Date: Oct. 8, 2015

(87) PCT Pub. No.: WO2014/166479
PCT Pub. Date: Oct. 16, 2014

(65) Prior Publication Data
US 2016/0047683 A1    Feb. 18, 2016

(30) Foreign Application Priority Data
Apr. 9, 2013   (DE) .................. 10 2013 005 963

(51) Int. Cl.
G01F 23/26   (2006.01)
(52) U.S. Cl.
CPC .......... G01F 23/263 (2013.01); G01F 23/266 (2013.01); G01F 23/268 (2013.01)
(58) Field of Classification Search
CPC ..... G01F 23/263; G01F 23/266; G01F 23/268
See application file for complete search history.

(56) References Cited

U.S. PATENT DOCUMENTS 3,781,672 A * 12/1973 Maltby .................. G01N 27/24
324/663
6,490,920 B1 * 12/2002 Netzer ..................... G01C 9/06
324/687

(Continued)

FOREIGN PATENT DOCUMENTS

DE    71 38 801 U    3/1974
DE    41 31 582 A1   3/1993

(Continued)

OTHER PUBLICATIONS

International Search Report of PCT/DE2014/100121, mailed Oct. 23, 2014.

*Primary Examiner* — Paul West
(74) *Attorney, Agent, or Firm* — Collard & Roe, P.C.

(57) ABSTRACT

A capacitive fill level sensor for measuring the fill level of a medium in a container has an electrode unit, which contains a strip-shaped measurement electrode, a strip-shaped counter electrode and a strip-shaped shielding electrode, the shielding electrode at least partially surrounding the measurement electrode. A first AC voltage source having a predefined frequency and amplitude is provided, to which the shielding electrode is connected such that a shielding capacitor formed between the shielding electrode and the measurement electrode has a shielding capacitance that is proportional to the length of the shielding electrode. A second AC voltage source of equal frequency and a predefined second amplitude is provided, the second amplitude being in phase opposition to the first amplitude, to which AC voltage source the counter electrode is connected, such that a measurement capacitor formed between the counter electrode and the measurement electrode has a measurement capacitance that is proportional to the fill level. The mea- (Continued)

surement electrode voltage present at the measurement electrode is used to determine the fill level.

17 Claims, 7 Drawing Sheets

(56) References Cited

U.S. PATENT DOCUMENTS

| | | |
|---|---|---|
| 7,509,856 B1 | 3/2009 | Winkens et al. |
| 8,587,329 B2 | 11/2013 | Winkens |
| 2009/0158841 A1 | 6/2009 | Winkens |

FOREIGN PATENT DOCUMENTS

| | | |
|---|---|---|
| DE | 199 49 985 A1 | 5/2001 |
| DE | 10 2009 002 674 A1 | 10/2010 |
| DE | 10 2009 017 011 A1 | 10/2010 |

* cited by examiner

CAPACITIVE FILL LEVEL SENSOR

CROSS REFERENCE TO RELATED APPLICATIONS

This application is the National Stage of PCT/DE2014/100121 filed on Apr. 8, 2014, which claims priority under 35 U.S.C. §119 of German Application No. 10 2013 005 963.1 filed on Apr. 9, 2013, the disclosure of which is incorporated by reference. The international application under PCT article 21(2) was not published in English.

The invention is based on a continuous capacitive fill level sensor having an electrode unit according to the generic part of the independent claim.

PRIOR ART

Capacitive fill level sensors can be used to measure fill levels of fluid media or of solid materials. In the case of a capacitive fill level sensor for measuring fill levels, a measurement impedance is developed, the ohmic component of which, but in particular the capacitive component of which, reflects a measure for the fill level.

In a simple embodiment of an electrode unit, a measurement electrode is provided, which is positioned, electrically insulated, on the outer wall of a container or in an immersion probe adjacent to a counter electrode.

In the published patent application DE 10 2009 017 011 A1, a capacitive fill level sensor is described, which enables a measurement of the fill height of a medium in a container. The capacitive sensor has a measurement electrode and a counter electrode, wherein the counter electrode is the electric ground, which can correspond to the ground potential. The two electrodes form a measurement capacitor having the medium as the dielectric. The capacitance of the measurement capacitor depends on the fill height of the medium. The capacitance of the measurement capacitor is measured by means of a comparison with the capacitance of a reference capacitor. Both capacitors are each connected to a voltage source via a resistor. In order to carry out the measurement, both capacitors are short-circuited by power switches in temporal sequence and thus discharged. The voltage increase at both capacitors following the opening of the switch depends on the charging resistances and the capacitances. By means of an assessment of the build-up time or by means of an assessment of the temporal mean value of the voltages applied on the capacitors, the fill height could be determined. In the exemplary embodiment shown, however, the temporal mean values of the voltages are compared with each other in a comparator. At the output of the comparator, a switch signal is available, which signals that the fill height has exceeded a certain measure or is below it.

In an exemplary embodiment, the measurement electrode is surrounded with a shielding electrode on both sides and on the rear side in order to eliminate the electromagnetic environmental influences. The shielding is an active shielding, in the case of which the potential of the shielding electrode is maintained on the potential of the measurement electrode. The capacitance of the capacitor, which is formed by the measurement electrode and the shielding electrode, has a value of at least approximately zero.

Due to an absolute measurement of the capacitance of the measurement capacitor formed by the measurement electrode and the counter electrode, the electrode unit is fixedly predefined and must be calibrated in each case in view of the nature of the medium.

A capacitive fill level sensor emerges from the published patent application DE 199 49 985 A1, which is operated in the context of an oscillation method. The operational frequency is in the region of 5 to 10 MHz. In order to compensate the container wall capacitance and to compensate an adhesive residue of the electrically conductive medium in the region of the electrodes, a further electrode is provided. The comparatively high operational frequency up to 10 MHz puts correspondingly high requirements on the electric shielding of the capacitive fill level sensor to meet the EMC regulations. The switch arrangement to operate the described measurement capacitor requires an absolute reference to the ground potential. Due to this, the function of the previously known capacitive fill level sensor depends on the design of the container in which the medium is stored, the fill height of which is to be measured.

The published patent application DE 10 2009 002 674 A1 describes a capacitive fill level sensor, in the case of which a measurement electrode is provided, which forms the measurement capacitor with an electric ground as the counter electrode. The measurement capacitor is part of a series resonant circuit, the resonant frequency of which depends on the impedance of the medium. The conductibility of the medium has an influence on the quality of the resonant circuit containing the measurement capacitor such that the fill level of the medium can be determined by means of an assessment of the amplitude and the frequency of the resonant signal. By including the electric ground, the previously known method can only be used in immersion probes having a grounded metal housing, wherein the measurement electrode must always be arranged close to the metal housing area.

In the published patent application DE 41 31 582 A1, a capacitive fill level sensor is described, which has a measurement electrode, a shielding electrode arranged behind the measurement electrode and a counter electrode, wherein the counter electrode is formed by the metallic container wall. The measurement electrode and the metallic container wall form a measurement capacitor, the capacitance of which depends on the fill level of the medium.

The utility model DE 7138801 U describes a capacitive fill level sensor having an electrode unit immersed in the medium, said electrode unit containing a strip-shaped measurement electrode and a strip-shaped counter electrode. The two electrodes form a measurement capacitor, the capacitance of which depends on the fill level of the medium. The measurement and counter electrodes are arranged adjacent to each other at a dielectric container wall in contact with which the medium is on one side. A shielding electrode is arranged on the side of the measurement electrode facing away from the medium. The measurement electrode and the shielding electrode are maintained on the same potential, such that no electric field and thus no capacitance can occur between the shielding electrode and the measurement electrode. The measurement capacitor is thus formed exclusively by the counter electrode and the measurement electrode, wherein only the electric field, passing within the medium, is effective, though not the electric field occurring between the counter electrode and the shielding electrode. The measurement result is thus not influenced by the capacitance developed between the counter electrode and the shielding and thus depends at least approximately only on the fill level of the medium.

The object underlying the invention is to specify a capacitive fill level sensor which enables a simple adaptation to different fill level measurement ranges or containers of different heights.

The object is solved by the features specified in the independent claim.

DISCLOSURE OF THE INVENTION

The invention is based on a capacitive fill level sensor for the continuous measurement of the fill level of a medium in a container, which has an electrode unit, which contains a strip-shaped measurement electrode, a strip-shaped counter electrode and a strip-shaped shielding electrode, wherein the shielding electrode at least partially surrounds the measurement electrode.

The capacitive fill level sensor according to the invention is characterised in that a first AC voltage source having a predefined frequency and amplitude is provided, to which the shielding electrode is connected such that a shielding capacitor formed between the shielding electrode and the measurement electrode has a shielding capacitance that is proportional to the length of the shielding electrode.

The capacitive fill level sensor according to the invention is further characterised in that a second AC voltage source of the same frequency and with predefined second amplitude is provided, wherein the second amplitude is in phase opposition to the first amplitude, to which the counter electrode is connected such that a measurement capacitor formed between the counter electrode and the measurement electrode has a measurement capacitance that is proportional to the fill level.

The measurement electrode voltage which may be tapped at the measurement electrode is dependent on the ratio of the shielding capacitance to the measurement capacitance and is thus used to determine the fill level. In this regard, the measurement electrode voltage or a signal derived therefrom can be emitted as an output signal for a measure of the fill level. Alternatively, the measurement electrode voltage can be used in the context of a control, wherein a control voltage can be provided as the output signal for a measure of the fill level.

The capacitive fill level sensor according to the invention is a highly flexible sensor for direct and continuous conversion of the fill level of a medium in a container into a corresponding output signal. As an output signal, an analogue voltage in the range of 0 to 10 V, for example, or an impressed current in the range of 4 to 20 mA, for example, can be provided.

The capacitive fill level sensor according to the invention is preferably arranged on a non-metallic outer wall of the container. The output signal reflects at all times a measure for the actual height of the fill level in the entire measurement range from zero, corresponding to the lower end of the electrode unit and up to the maximum valve corresponding to the upper end of the electrode unit.

A rather particular advantage of the capacitive fill level sensor according to the invention having the electrode unit is that the length of the electrode unit can be adapted individually by simply cutting to a predefined fill level measurement range, corresponding to a predefined height of the container. The capacitive fill level sensor according to the invention can thus be manufactured and delivered inexpensively for example as bulk goods.

The output signal, independently of the length of the electrode unit, always uses the same electric range provided, which is between the minimum and the maximum fill level to be measured, wherein the only condition is that the thickness of the wall of the container as well as, in particular, the electric properties of the medium remain at least approximately the same. Thus a fill level measurement range in the case of a container of, for example, 10 cm maximum fill level or in the case of a high container of, for example, 100 cm maximum fill level are distributed to the same range of the output signal of 0 to 10 V or 4 to 20 mA already mentioned by way of example without further engagement in a signal processing arrangement.

Both the measurement capacitance of the measurement capacitor and the shielding capacitance of the shielding capacitor change equally with the freely selectable length of the electrode unit and as a function of the fill level. Due to the synchronisation of both capacitances, the fill level-dependent proportion of the measurement capacitance in relation to the shielding capacitance remains constant independently of the freely configurable length of the electrode unit. Under the above-mentioned condition, the output signal thus always passes through the same hub or value range independently of whether the length of the electrode unit is, for example only 10 cm or, for example 100 cm.

Due to the phase opposition impact of the counter electrode, on the one hand, and the shielding electrode, on the other hand, with the AC voltages provided by both AC voltage sources, the potential of the electric field lines is identical to the ground potential or the ground in the geometric centre between the measurement electrode and the counter electrode. The measurement results are thus independent of the grounding conditions at the container.

Advantageous developments and embodiments are each subject matters of dependent claims.

A first embodiment makes provision for the shielding electrode to be designed as a third strip-shaped shielding electrode, which is arranged on the rear side of the measurement electrode facing away from the container and for the third shielding electrode to cover the measurement electrode. With this measure, not only the shielding capacitor is formed, but an electromagnetic shielding is also simultaneously achieved against disturbance signals from the environment.

An alternative or additional embodiment makes provision for the shielding electrode to be designed as a first strip-shaped shielding electrode and as a second strip-shaped shielding electrode, for the first shielding electrode to be arranged on the one side next to the measurement electrode and the second shielding electrode to be arranged on the other side next to the measurement electrode and for the first, second and third shielding electrodes to be electrically connected to one another. Due to the fact that the first and second shielding electrodes are arranged in the same plane as the measurement electrode, a simple installation of the first and second shielding electrode results.

The wall of the container is located in the electric field between the first shielding electrode and the measurement electrode or between the second shielding electrode and the measurement electrode. The value of the two partial shielding capacitances is thus dependent on the dielectric of the wall of the container. With an increase of the dielectric of the wall of the container, not only the shielding capacitance increases, but also the coupling or the voltage at the measurement electrode resulting from the coupling. However, the coupling of the measurement electrode to the medium also increases simultaneously. The influence of the material of the wall of the container is compensated in this way within certain limits. The same applies for an adhesive residue of foaming media adhering to the inner wall of the container, said media may occur in particular in the case of a decreasing fill level.

A development of this embodiment makes provision for the counter electrode, the measurement electrode as well as the first and second shielding electrode to be arranged on a carrier layer, which is implemented, for example, as a flexible printed circuit board.

According to one embodiment, provision is made for an insulation layer to be provided at least in the region between the third shielding electrode, on the one hand, and the measurement electrode, the first shielding electrode as well as the second shielding electrode. The insulation layer, which preferably has a low dielectric constant, enables a simple specification of the shielding capacitance, during manufacturing, in relation to the unit of length of the electrode unit.

The insulation layer is preferably implemented as a foam material adhesive tape. A simple adaption of the electrode unit to the curve of the outer wall of the container is thus, in particular, possible.

One embodiment makes provision for the rear side of the electrode unit, corresponding to the rear side of the third shielding electrode and the counter electrode, to be coated with an insulating protective layer. The electrodes manufactured from, for example, copper foil are thus protected against environmental influences.

Another embodiment makes provision for an adhesive layer to be provided on the side of the electrode unit facing the container to fix the electrode unit on the outer wall of the container. The adhesive layer enables, in particular a simple installation on a curved outer wall of the container.

Another development of the capacitive fill level sensor according to the invention makes provision for the measurement electrode, the counter electrode as well as the shielding electrode to be directly connected on a printed circuit board of a first electronic unit, which is arranged directly on the container. The electrodes are directly soldered on the printed circuit board. In particular, the electronic unit can contain a signal processing arrangement for controlling the electrodes as well as the complete evaluation circuit, such that an output signal can be provided at the output of the first electronic unit, which reflects the fill level.

Alternatively, a second electronic unit separated from the electrode unit can be provided.

One embodiment of the capacitive fill level sensor according to the invention makes provision for the second AC voltage source to be implemented as an inverter, the input of which is connected to the first AC voltage source. With this measure, the implementation of the second AC voltage source is particularly inexpensive, wherein the provision of the phase opposition AC voltage is simultaneously ensured. The inverter is preferably set to a gain factor of at least approximately one. By changing the gain factor, an adaption to different geometries of the electrodes can take place without particular effort.

Another embodiment makes provision for the frequency of the AC voltage sources to be set to a value between 0.1 MHz and 30 MHz. The selection of the frequencies in the indicated range enables, on the one hand, a sufficient coupling of the AC voltage from the shielding electrode and the counter electrode to the measurement electrode. On the other hand, the AC voltages in this frequency range can be implemented with simple means. The frequency is preferably, for example, set to at least approximately 1 MHz.

One embodiment makes provision for a rectifier to rectify the measurement electrode voltage occurring at the measurement electrode, wherein the DC voltage applied to the output of the rectifier can be used as an output signal, which can be assessed as a measure for the fill level.

Due to the anticipated low capacitances and thus high source impedance of the capacitive fill level sensor according to the invention, an impedance transformer is preferably connected between the measurement electrode and the rectifier, said impedance transformer only slightly charging the measurement electrode and being able to control the downstream rectifier at low resistance.

A particularly advantageous development makes provision for the first AC voltage source to be implemented as a controlled AC voltage source, the output voltage of which is changeable as a function of a control voltage.

The control voltage is set as a function of the output signal of a comparator, which compares the DC voltage provided by the rectifier to a fixedly predefined reference voltage. A closed control circuit thus results, which keeps the measurement electrode voltage which can be tapped at the measurement electrode constant. In the case of this development, the control voltage can be used as output voltage, which reflects a measure for the fill level. Ultimately, in the case of this development, the measurement electrode voltage which can be tapped at the measurement electrode is also used to determine a measure for the fill level, although the measurement electrode voltage is maintained constant.

Further advantageous developments and embodiments of the capacitive fill level sensor according to the invention result from the following description.

Exemplary embodiments of the invention are depicted in the drawing and explained further in the following description.

DETAILED DESCRIPTION OF THE EXEMPLARY EMBODIMENTS

Figure 1:
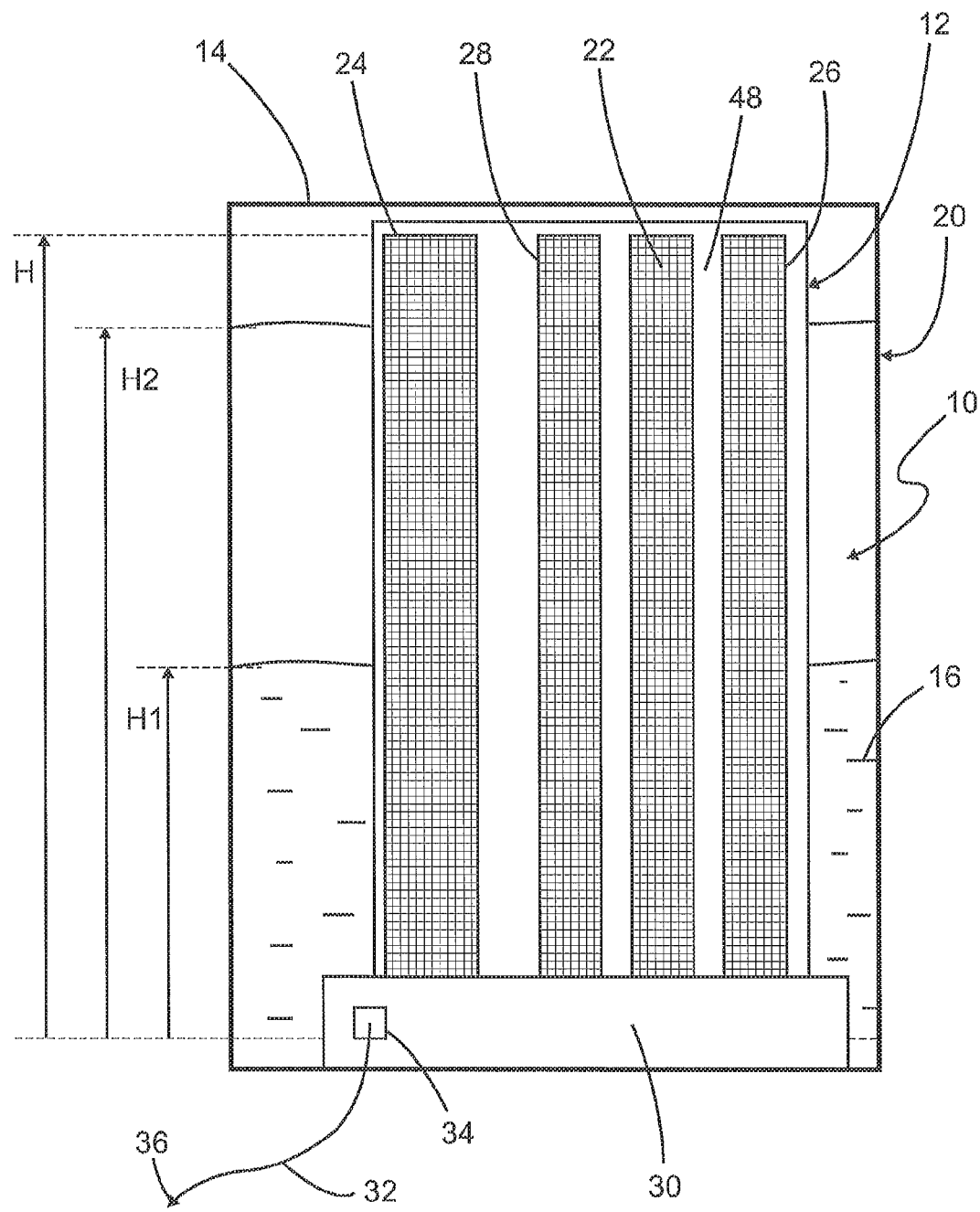
FIG. 1 shows a capacitive fill level sensor according to the invention, which is cut in the region of an electrode unit in the vertical direction (dt.: Höhenrichtung)

FIG. 1 shows a capacitive fill level sensor 10 according to the invention, which is cut in the region of an electrode unit 12 in the vertical direction. The capacitive fill level sensor 10 measures the fill level H1, H2 of a medium 16 located in a container 14 in a fill level measurement range H. In the exemplary embodiment shown, the medium 16 has a first fill level H1. A possible second fill level H2 is also displayed.

The electrode unit 12 is adhered to the outer wall 20 of the container 14 by means of an adhesive layer 18. Due to the partially cut depiction, a measurement electrode 22, a counter electrode 24, a first shielding electrode 26 as well as a second shielding electrode 28 are visible. The electrode unit 12 is connected to a first electronic unit 30, which is arranged at the lower end of the container 14 in the exemplary embodiment shown. An output signal 36 is provided via a line 32 which is contacted by means of a plug connector 34 with the first electronic unit 30, said output signal being a measure for the fill level H1, H2 or all occurring fill levels in the fill level measurement range H of the medium 16 in the container 14.

Figure 2:
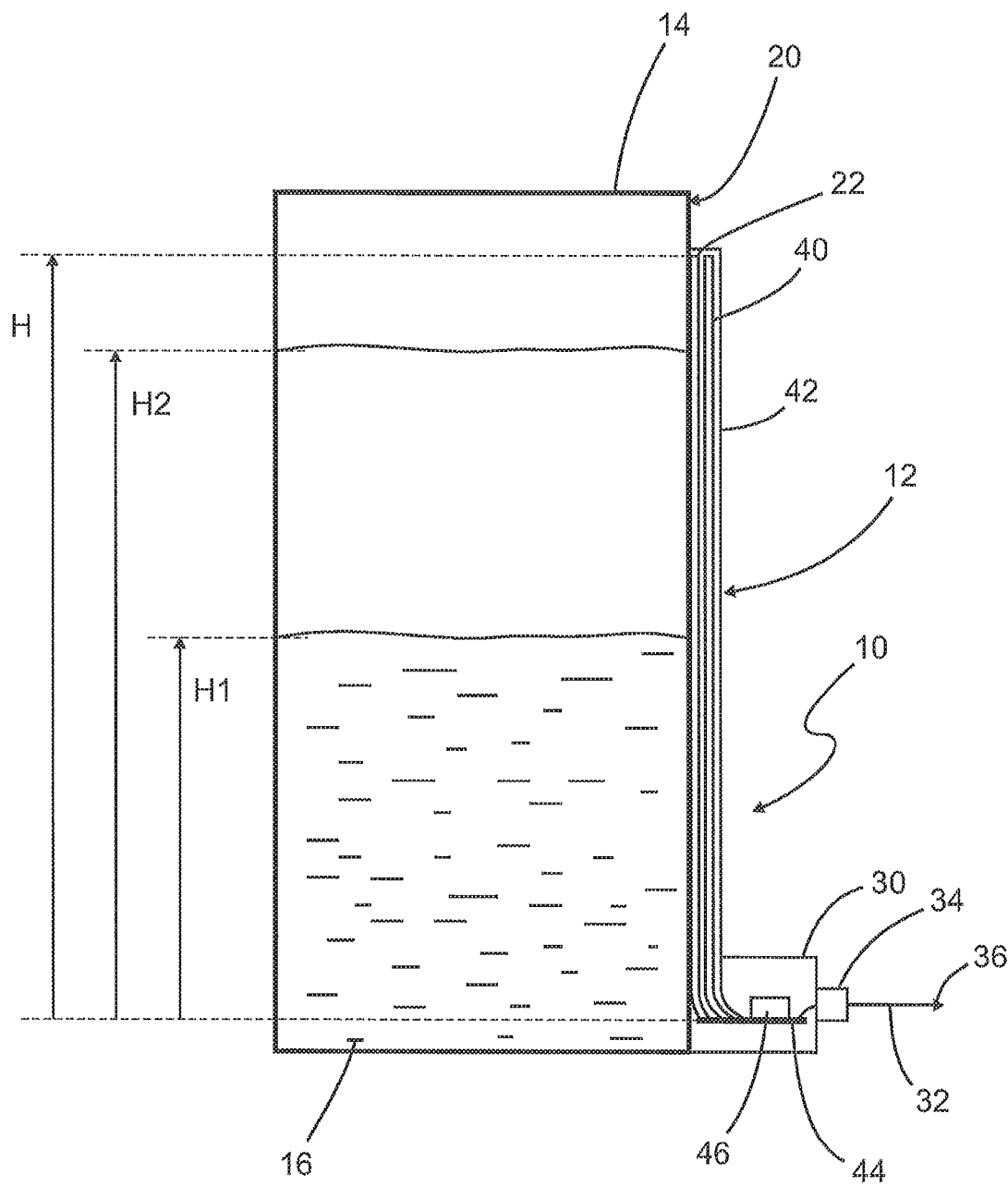
FIG. 2 shows a section in the vertical direction through a capacitive fill level sensor according to the invention.

The capacitive fill level sensor 10 according to the invention shown in FIG. 2 and cut in the region of the measurement electrode 22 in the vertical direction shows a third shielding electrode 40 arranged on the rear side of the measurement electrode 22.

The parts shown in FIG. 2, which match the parts shown in FIG. 1, each bear the same reference numbers. This also applies for the following figures.

The electrode unit 12 is at least on the rear side surrounded by a protective layer 42. The electrodes 22, 24, 26, 28, 40 are contacted with a printed circuit board 44 arranged in the first electronic unit 30, for example by means of soldering. The first electronic unit 30 contains a signal processing arrangement 46.

Figure 3:
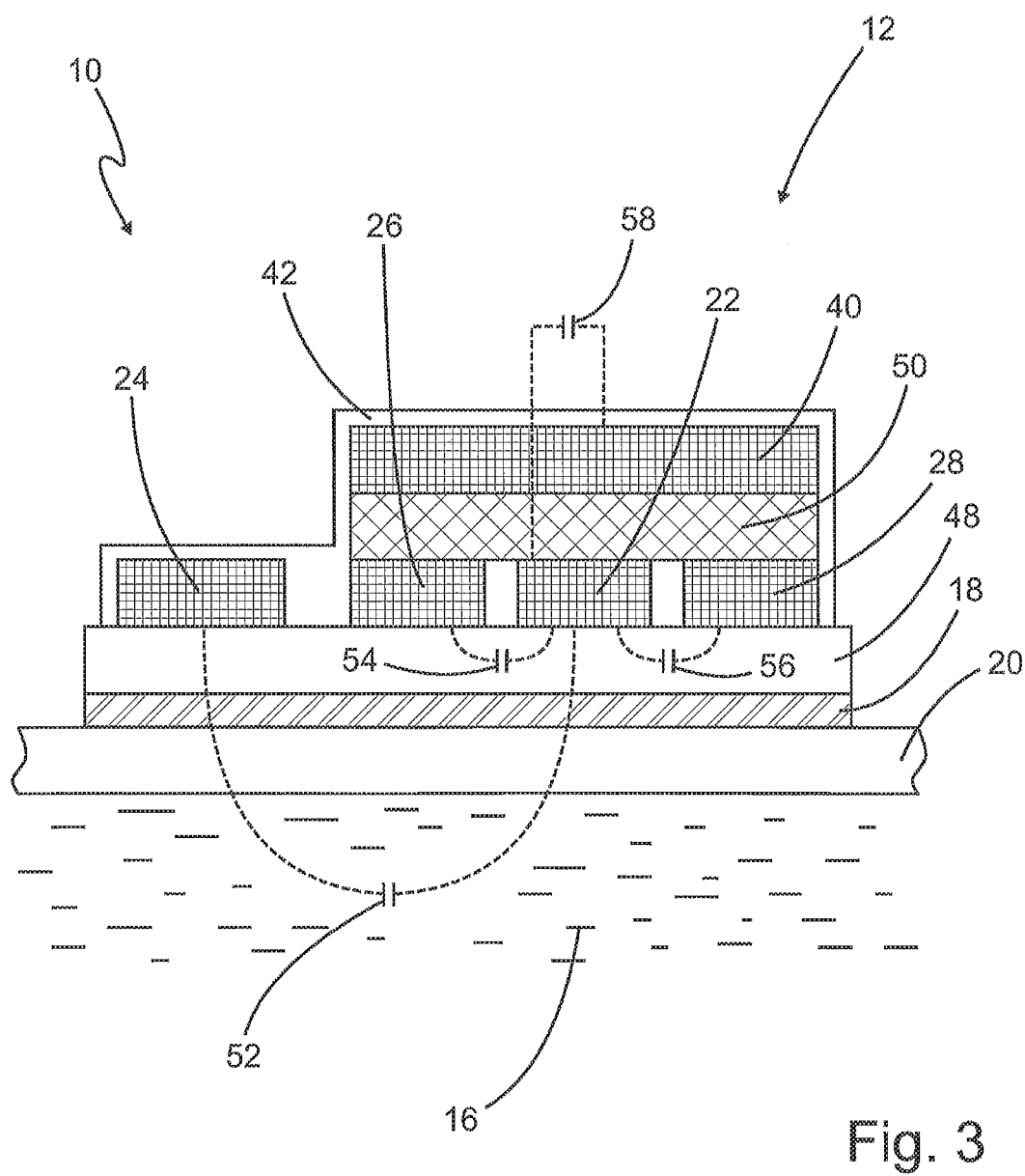
FIG. 3 shows a cross-section through an electrode unit of a capacitive fill level sensor according to the invention.

FIG. 3 shows a cross-section through the electrode unit 12 of the capacitive fill level sensor 10 according to the invention. The container wall 20 as well as the electrode unit 12 are shown linearly such that the capacitive fill level sensor 10 according to the invention is, for example, positioned on a rectangular container 14. In the case of a cylindrical container 14, the outer wall 20 has a curve, to which the electrode unit 12 can be readily adapted due to the construction thereof described in detail below.

The electrode unit 12 is adhered to the non-metallic outer wall 20 of the container 14 by means of the adhesive layer 18. The adhesive layer 18 is applied on the side of a carrier layer 48 facing the container 14, preferably on a flexible printed circuit board, which preferably contains the counter electrode 24, the first shielding electrode 26, the measurement electrode 22 as well as the second shielding electrode 28 as conductor paths.

An insulation layer 50 is provided on the rear side of the measurement electrode 22 as well as the first and second shielding electrode 26, 28, said insulation layer preferably having a low dielectric constant. The insulation layer 50 is, for example, produced from a foam material adhesive tape. The insulation layer 50 separates the measurement electrode 22 as well as the first and second shielding electrode 26, 28 from the third shielding electrode 40.

The rear region of the electrode unit 12 in relation to the container 14 is surrounded by a protective layer 42, which protects the electrode unit 12, in particular from environmental influences.

The complete electrode unit 12 is manufactured from flexible materials such that the electrode unit 12 can be readily adapted to different outer wall curves of cylindrical or oval containers 14.

In FIG. 3, the individual components of the electrode unit 12 are depicted significantly enlarged to illustrate the construction. The following dimensions can be provided by way of example: the widths of the measurement electrode 22 as well as of the first and second shielding electrode 26, 28 can be, for example, 3.5 mm, while the width of the third shielding electrode 40 can be, for example between 8 to 13 mm. The width of the counter electrode 24 is, for example, 8 mm. The thickness of the insulation layer 50 is, for example, 1 mm. The thicknesses of the adhesive layer 18, the electrodes 22, 24, 26, 28, 40 as well as the protective layer 42 are in the micrometer range. The thickness of the carrier material 48, which is, for example, implemented as a flexible printed circuit board, is, for example, in the upper micrometer range.

A significant advantage of the construction of the capacitive fill level sensor 10 according to the invention having the electrode unit 12 shown is that the electrode unit 12 can be adapted by the user in a simple manner to different fill level measurement ranges H corresponding to different heights of containers 14 by shortening the electrode unit 12, for example by means of scissors, to the required length. The capacitive fill level sensor 10 according to the invention can thus be manufactured and provided, for example, as bulk goods.

The electrodes 22, 26, 28, 40, to an extent, form a half-coaxial structure, in the case of which the measurement electrode 22 is comparable with the inner conductor of a coaxial line, which is open to the outer wall 20 of the container 14, yet is shielded at the sides by the first and second shielding electrode 26, 28 and at the rear by the third shielding electrode 40.

In the exemplary embodiment shown in FIGS. 1 and 2, the first electronic unit 30 is positioned at the lower end of the electrode unit 12. In another embodiment, not shown in further detail, the first electronic unit 30 can be installed at any vertical position of the electrode unit 12 and can be contacted with the electrode unit 12.

In a further embodiment, a second electronic unit 12, not shown in further detail, is provided instead of the first electronic unit 30, which is directly connected to the electrode unit 12, said second electronic unit being arranged separated from the electronic unit 12. In this case, the electrode unit 12 is connected to the second electronic unit with an at least S-wire, preferably pluggable cable.

The printed circuit board 44, the ends of the electrodes 22, 24, 26, 28, 40 lying inside a housing of the first electronic unit 30, the signal processing arrangement 46 as well as the further components of the first electronic unit 30, can be surrounded with a fill material, for example casting resin, such that the first electronic unit 30 is protected, in particular against environmental influences.

Due to the construction of the electrode unit 12, a measurement capacitor 52 is formed between the measurement electrode 22 and the counter electrode 24, said measurement capacitor having a fill level-dependent measurement capacitance. The measurement capacitance has a small basic amount, which is linearly dependent on the fill level measurement range H. The measurement capacitance, in particular, however, has a fill level-dependent value that is proportional to fill level H1, H2 of the medium 16 in the container 14.

A first shielding capacitor 54 is formed between the first shielding electrode 26 and the measurement electrode 22; a second shielding capacitor 56 is formed between the measurement electrode 22 and the second shielding electrode 28 and a third shielding capacitor 58 is formed between the measurement electrode 22 and the third shielding electrode 40. The capacitances of the shielding capacitors 54, 56, 58 are exclusively dependent and proportional to the fill level measurement range H, corresponding to the length of the electrode unit 12. The shielding capacitances thus increase linearly with the length of the electrode unit 12.

Figure 4:
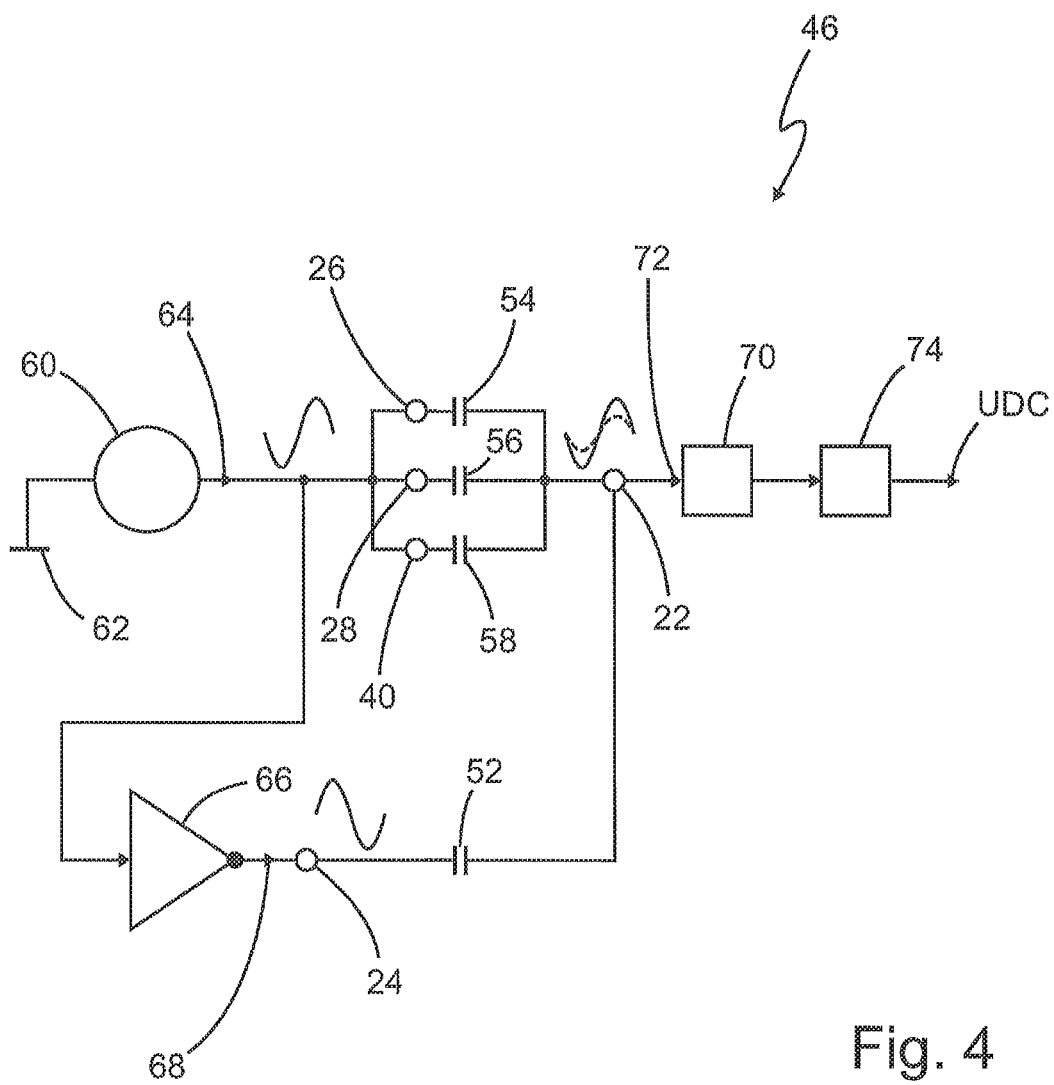
FIG. 4 shows a first exemplary embodiment of a signal processing arrangement.

In FIG. 4, an exemplary embodiment of the signal processing arrangement 46 is shown, which is provided for operating the electrode unit 12.

The signal processing arrangement 46 contains a first AC voltage source 60, which is connected between a ground 62 and the shielding electrodes 26, 28, 40 electrically connected to one another, corresponding to the shielding capacitors 54, 56, 58. The first AC voltage source 60 provides a first, preferably sinusoidal AC voltage 64, the frequency of which is, for example in the range of 0.1 to 30 MHz. The frequency of the first AC voltage is preferably set to 1 MHz. The frequency is to be set in such a way that, on the one hand, only a small undesired emission of the signal takes place and, on the other hand, however, a sufficiently high signal level occurs at the measurement electrode 22 in view of the comparatively low capacitances occurring, which are in the picofarad range.

Furthermore, a second AC voltage source 66 is provided, which is implemented in the exemplary embodiment shown as an inverter. The second AC voltage source 66 is connected to the counter electrode 24. The second AC voltage source 66 provides a second AC voltage 68, which has the same frequency as the first AC voltage 64, which, however, is phase-shifted by 180°, i.e. is in phase opposition to the first AC voltage 64.

If necessary, there is a comparison possibility for the amplitude of the first or the second AC voltage 64, 68, in order to be able to adapt at least one AC voltage 64, 68 to different geometries of the electrodes 22, 24, 26, 28, 40. In the exemplary embodiment shown, it is assumed that the second AC voltage source 66 implemented as an inverter has the gain factor 1, such that the amplitude of the first AC voltage 64 is at least approximately equal to the amplitude of the second AC voltage 68.

The measurement electrode 22 is preferably connected to an impedance transformer 70, which only slightly charges the measurement electrode 22, yet passes on a measurement electrode voltage 72 occurring at the measurement electrode 22 to a downstream rectifier 74 at low resistance. The rectifier 74 provides a DC voltage UDC, which corresponds to the rectified measurement electrode voltage 72.

The measurement capacitor 52, on the one hand, and the shielding capacitors 54, 56, 58 lying parallel, on the other hand, form a capacitive voltage divider. A divided, fill level-dependent measurement electrode voltage 72 occurs at the measurement electrode 22. The sum of the shielding capacitances of the shielding capacitors 54, 56, 58 forms the reference.

With increasing fill level of the medium 16, the capacitance of the measurement capacitor 52 increases with respect to the constant shielding capacitance of the shielding capacitors 54, 56, 58. The measurement electrode voltage 72 decreases in the event of rising fill level H1, H2 of the medium 16 because the voltages behave contrarily to the capacitances of the capacitors 52, 54, 56, 58.

In FIG. 4, the first AC voltage 64 as well as the second AC voltage 68 are each recorded with constant amplitude and the measurement electrode voltage 72 with two different amplitudes, wherein in the case of a smaller fill level H1, the higher amplitude (continuous line) occurs and in the case of a higher fill level H2, the lower amplitude (dotted line) occurs.

The measurement electrode voltage 72 could already be used directly as a measure for the fill level H1, H2, wherein the highest measurement electrode voltage 72 occurs in the case of the lowest measurable fill level H1, H2 and the lowest measurement electrode voltage 72 in the case of the highest measurable fill level H1, H2. However, in the case of this exemplary embodiment, the DC voltage UDC is preferably used instead of the measurement electrode voltage 72 directly as the measure for the fill level H1, H2 and is provided as the output signal 36. In the case of this exemplary embodiment of the signal processing arrangement 46, the variable measurement electrode voltage 72 is used as a measure for determining the fill level H1, H2 of a medium 16 in a container 14.

Figure 5:
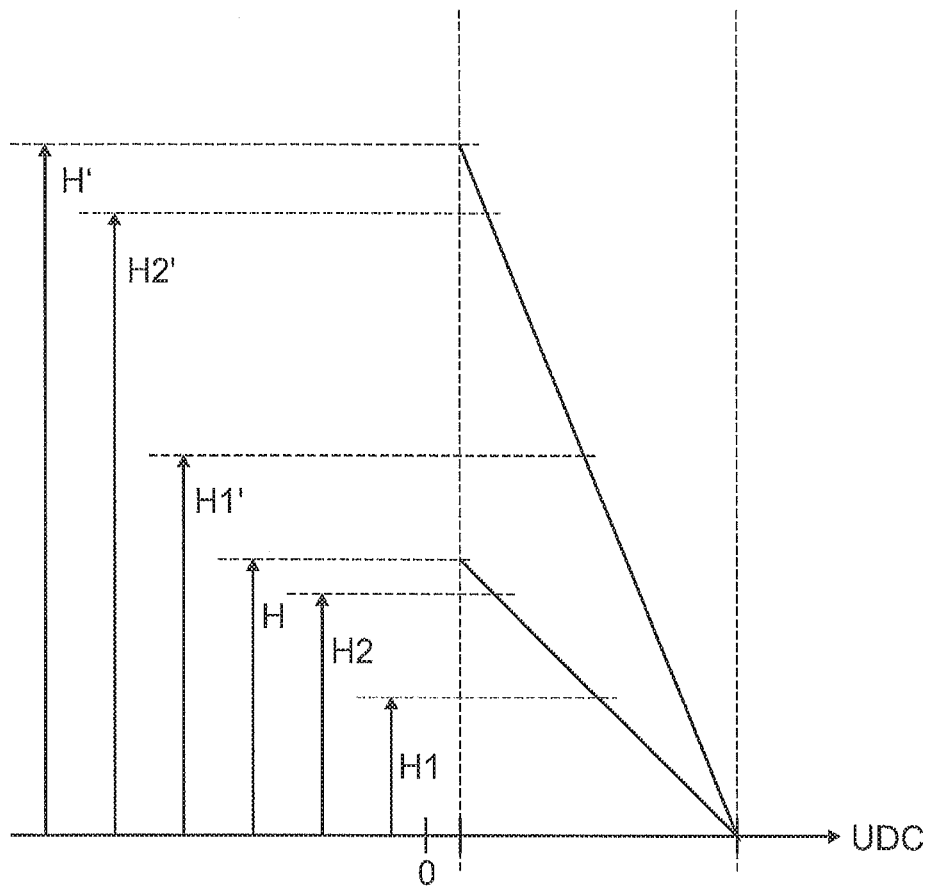
FIG. 5 shows a functional connection between an output signal of the signal processing arrangement shown in FIG. 4 and fill levels.

FIG. 5 shows functional connections between the DC voltage UDC for two different fill height measurement ranges H, H', which are provided for two containers 14 of different height. The DC voltage UDC corresponds to the output voltage 36 of the capacitive fill level sensor 10.

By means of further functional blocks, not shown, the DC voltage UDC can be converted into a predefined range of the output signal 36. For example, the output signal 36 can be converted and output in the range of 0 to 10 V or the range of 4 to 20 mA.

In the exemplary embodiment shown, the smallest DC voltage UDC corresponding to the higher fill level H2 is not set to the value zero. The smallest value of the DC voltage UDC can of course be set to the value zero as a function of the desired design.

The significant advantage of the capacitive fill level sensor 10 according to the invention is that the electrode unit 12 can be adapted by the user himself to the required fill level measurement range H, H' by simply shortening the longer electrode unit 12 delivered.

The functional connections shown in FIG. 5 immediately allow a further advantage of the capacitive fill level sensor 10 according to the invention be recognised, which is that without further action by the user, any capacitive fill level sensor 10 cut to size provides the same voltage range of the DC voltage UDC or the same voltage range of the output signal 36 as a function of the respective fill level measurement range H, H'. The scaling for different fill level measurement ranges H, H' is independent of the length of the electrode unit 12. The smaller fill level measurement range H having the fill levels H1, H2 shown by way of example uses the entire available voltage range of the DC voltage UDC or the output signal 36 just like the larger fill level measurement range H' having the fill levels H1', H2' shown by way of example. In the case of at least approximately identical media 16, no engagement in the signal processing arrangement 46 is required for this purpose.

Figure 6:
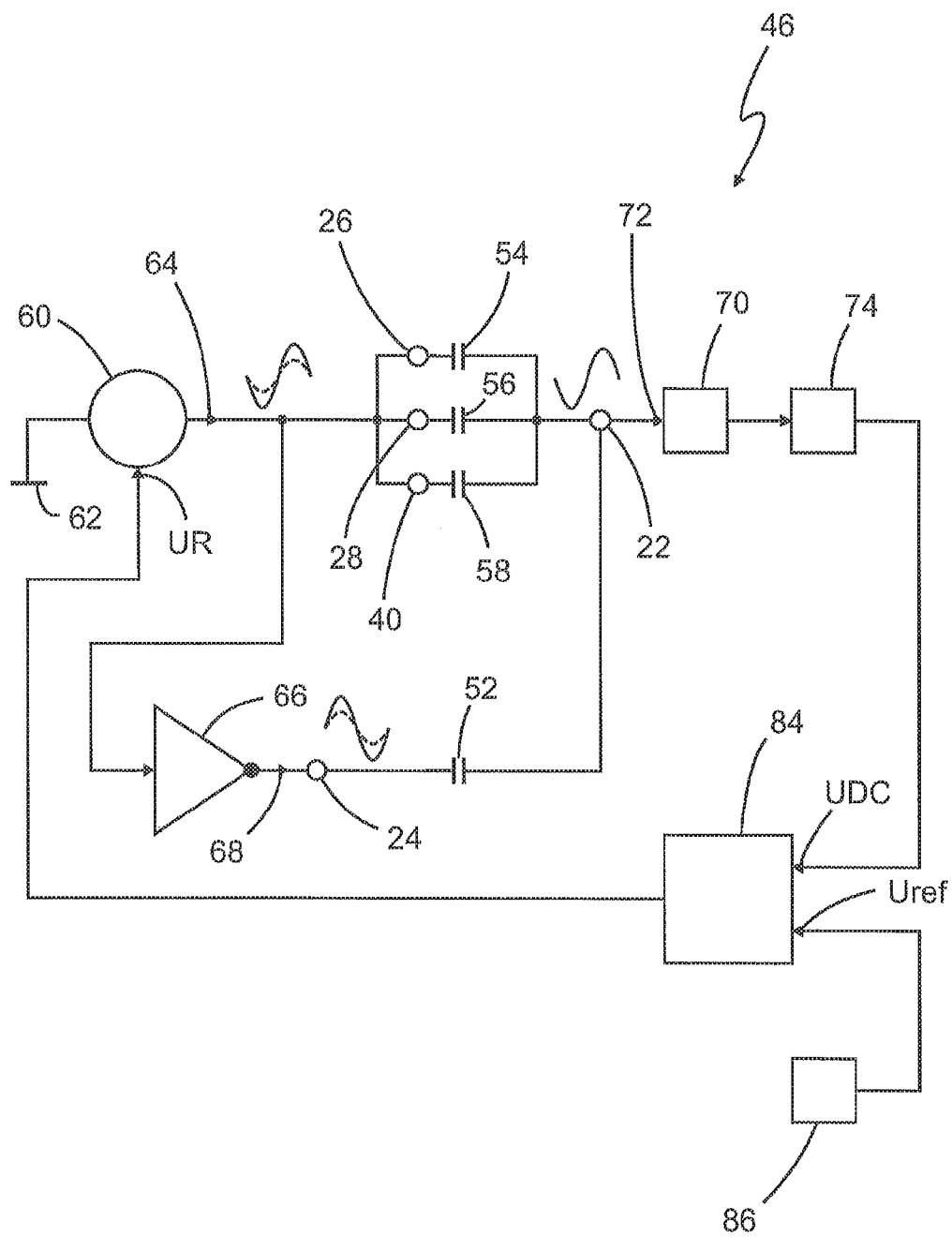
FIG. 6 shows a second exemplary embodiment of a signal processing arrangement and FIG. 7 shows functional connections between an output signal of the signal processing arrangement shown in FIG. 6 and fill levels.

FIG. 6 shows another exemplary embodiment of the signal processing arrangement 46, which provides an output signal 36 that is proportional to the fill level H1, H2 of the medium 16, i.e. the output signal 36 similarly increases with increasing fill level H1, H2.

The first AC voltage source 60 is designed in this exemplary embodiment as a controllable first AC voltage source 60, wherein the amplitude of the first AC voltage 64 is changeable by means of a control voltage UR. The amplitude of the first AC voltage 64 is thus predefined by the control voltage UR. In the case of this exemplary embodiment, the DC voltage UDC is made available to a comparator 84, which compares the DC voltage UDC with a reference voltage URef provided by a reference voltage source 86 and provides the control voltage UR as a function of the comparison result.

The reference voltage URef is, for example 1 V. The comparator 84 is, for example implemented as a high-gain differential amplifier such that the output signal is proportional to the difference between the DC voltage UDC and the reference voltage URef. If required, a comparing element can also be used as the comparator 84. In this case, it must be ensured that the resulting control circuit is sufficiently damped in order to avoid control oscillations.

The resulting control circuit ensures that the first AC voltage 64 and thus the second AC voltage 68 are controlled to an amplitude at which the measurement electrode voltage 72 and correspondingly the DC voltage UDC resulting therefrom can be maintained constant and at the value of the reference voltage URef. In FIG. 6, the first AC voltage 64 as well as the second AC voltage 68 are thus depicted with a high amplitude (continuous line) corresponding to a higher fill level H2 and with a lower amplitude (dotted line) corresponding to a lower fill level H1, while the measurement electrode voltage 72 is depicted as constant.

In the case of this exemplary embodiment of the signal processing arrangement 46, the control voltage UR can also be used as the output signal 36, which is proportional to the fill level H1, H2; H1', H2' of the medium 16 in the container 14. Also in the case of this exemplary embodiment of the signal processing arrangement 46, the measurement electrode voltage 72, maintained constant in this exemplary embodiment, is ultimately used as a measure for determining the fill level H1, H2; H1', H2' of a medium 16 in a container 14.

Figure 7:
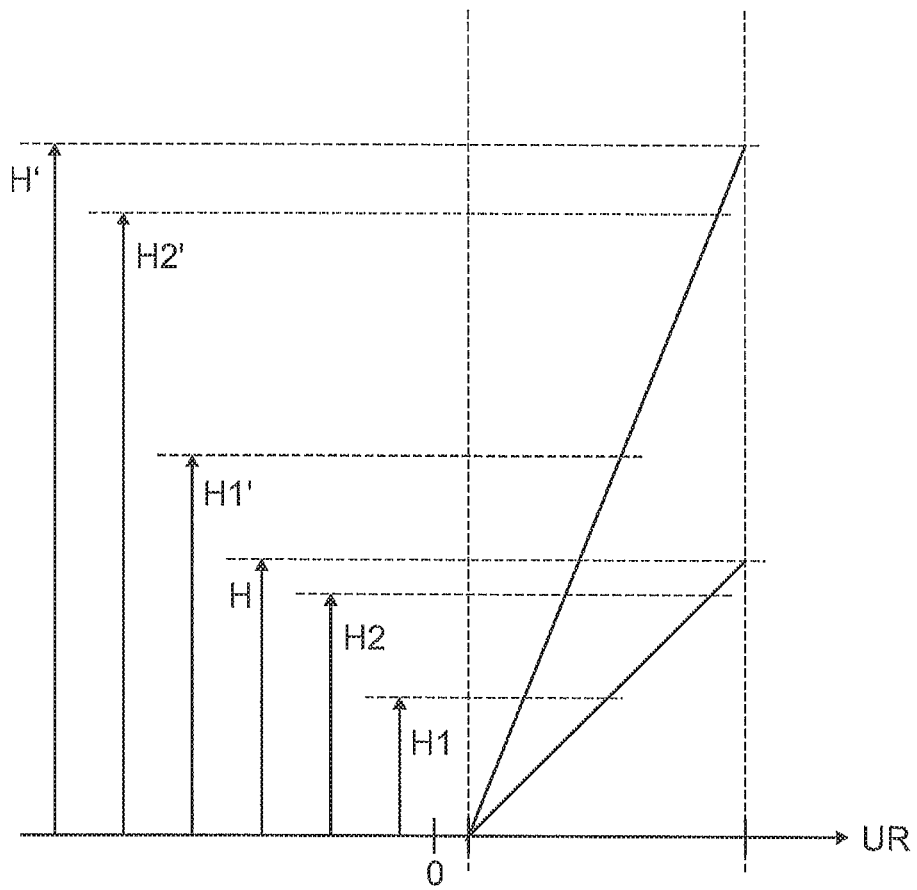

In FIG. 7, two functional connections between the control voltage UR and the fill levels H1, H2; H1', H2' are shown for two different fill level measurement ranges H, H'. The control voltage UR corresponds to the output voltage 36 of the capacitive fill level sensor 10.

Also in the case of this exemplary embodiment of the signal processing arrangement 46 according to the invention, the output signal 36 of course scales to the entire predefined range of, for example 0 to 10 V or for example 4 to 20 mA without engagement in the signal processing arrangement 46 by the user, independently of the cut length of the electrode unit 12 and thus independently of the set fill level measurement range H, H'.

It is visible from FIG. 7 that a low level of the control voltage UR or of the output signal 36 corresponds to a low fill level H1, H1' and a higher level of the control voltage UR or of the output signal 36 corresponds to a higher fill level H2, H2'. Two different fill levels H1, H2; H1', H2' are again recorded by way of example, which can occur for two different fill level ranges H, H'.

The invention claimed is:

1. Capacitive fill level sensor (10) for measuring the fill level (H1, H2; H1', H2') of a medium (16) in a container (14), having an electrode unit (12), which has a strip-shaped measurement electrode (22), a strip-shaped counter electrode (24) and a strip-shaped first shielding electrode (26, 28, 40), wherein the first shielding electrode (26, 28, 40) surrounds the measurement electrode (22) at least partially, wherein a first AC voltage source (60) having a predefined frequency and amplitude is present, which is applied to the ground (62) and to which the first shielding electrode (26, 28, 40) is connected such that a shielding capacitor (54, 56, 58) formed between the first shielding electrode (26, 28, 40) and the measurement electrode (22) has a shielding capacitance that is proportional to the length of the first shielding electrode (26, 28, 40), wherein a second AC voltage source (66) of the same frequency and with predefined second amplitude is present, wherein the second amplitude is in phase opposition to the first amplitude, which is applied to the ground (62) and to which the counter electrode (24) is connected such that a measurement capacitor (52) formed between the counter electrode (24) and the measurement electrode (22) has a measurement capacitance, which is proportional to the fill level (H1, H2; H1', H2') and wherein the measurement electrode voltage (72) applied to the measurement electrode (22) in relation to the ground (62) is used to determine the fill level (H1, H2; H1', H2').

2. Capacitive fill level sensor according to claim 1, further comprising a second strip-shaped shielding electrode (40), which is arranged on the rear side of the measurement electrode (22) facing away from the container (14) and covers the measurement electrode (22).

3. Capacitive fill level sensor according to claim 2, further comprising a third strip-shaped shielding electrode (28), wherein the first shielding electrode (26) is arranged on the one side next to the measurement electrode (22) and the third shielding electrode (28) is arranged on the other side next to the measurement electrode (22) and wherein the first, second and third shielding electrodes (26, 28, 40) are electrically connected to one another.

4. Capacitive fill level sensor according to claim 3, wherein the counter electrode (24), the measurement electrode (22) as well as the first and third shielding electrode (26, 28) are arranged on a carrier layer (48).

5. Capacitive fill level sensor according to claim 4, wherein an insulation layer (50) is present at least in the region between the second shielding electrode (40), on the one hand, and the first shielding electrode (26), the measurement electrode (22) and the third shielding electrode (28), on the other hand.

6. Capacitive fill level sensor according to claim 5, wherein the insulation layer (50) is implemented as foam material adhesive strip.

7. Capacitive fill level sensor according to claim 2, wherein the rear side of the second shielding electrode (40) and the counter electrode (24) is coated with a protective layer (42).

8. Capacitive fill level sensor according to claim 1, wherein the electrode unit (12) has an adhesive layer (18) on the side facing the container (14) to fix the electrode unit (12) on the outer wall (20) of the container (14).

9. Capacitive fill level sensor according to claim 1, wherein the measurement electrode (22), the counter electrode (24) as well as the shielding electrode (26, 28, 40) are connected on a printed circuit board (44) of a first electronic unit (30), which is arranged directly on the container (14).

10. Capacitive fill level sensor according to claim 1, wherein a plug connector (34) is present for connecting the electronic unit (30).

11. Capacitive fill level sensor according to claim 1, wherein the second AC voltage source (66) is implemented as an inverter, the input of which is connected to the first AC voltage source (60).

12. Capacitive fill level sensor according to claim 11, wherein the inverter has a gain factor of one.

13. Capacitive fill level sensor according to claim 11, wherein the frequency of the AC voltage sources (60, 66) is set to a value between 0.1 MHz and 30 MHz.

14. Capacitive fill level sensor according to claim 13, wherein the frequency is set to 1 MHz.

15. Capacitive fill level sensor according to claim 1, wherein a rectifier (74) is provided for rectifying the measurement electrode voltage (72) occurring at the measurement electrode (22) and wherein the DC voltage (UDC) occurring at the output of the rectifier (74) is used as an output signal (36), which is a measurement for the fill level (H1, H2; H1', H2').

16. Capacitive fill level sensor according to claim 15, wherein an impedance transformer (70) is present between the measurement electrode (22) and the rectifier (74).

17. Capacitive fill level sensor according to claim 15, wherein the first AC voltage source (60) is implemented as a controlled AC voltage source (60), wherein the amplitude of the first AC voltage source (64) is changeable as a function of a control voltage (UR), wherein a comparator (84) is present, which compares the DC voltage (UDC) with a reference voltage (URef) and sets the control voltage (UR) as a function of the comparison result, whereby a control circuit results, which maintains constant the measurement electrode voltage (72) and wherein the control voltage (UR) is used as an output signal (36), which is a measurement for the fill level (H1, H2; H1', H2').

\* \* \* \* \*